US008955201B2

(12) United States Patent
Bogoslofski et al.

(10) Patent No.: US 8,955,201 B2
(45) Date of Patent: Feb. 17, 2015

(54) FLEXIBLE STRAP FOR A SECUREMENT MECHANISM

(75) Inventors: Kevin Bogoslofski, Southington, CT (US); John Laverack, Southbury, CT (US); Greg Weaver, Waterbury, CT (US)

(73) Assignee: Thule Sweden AB, Hillerstorp (SE)

( * ) Notice: Subject to any disclaimer, the term of this patent is extended or adjusted under 35 U.S.C. 154(b) by 94 days.

(21) Appl. No.: 13/548,914

(22) Filed: Jul. 13, 2012

(65) Prior Publication Data

US 2013/0181022 A1 Jul. 18, 2013

Related U.S. Application Data

(60) Provisional application No. 61/508,501, filed on Jul. 15, 2011.

(51) Int. Cl.
| | |
|---|---|
| *A45F 5/00* | (2006.01) |
| *B65D 63/10* | (2006.01) |
| *B60R 9/10* | (2006.01) |
| *B60R 9/06* | (2006.01) |
| *B60P 7/08* | (2006.01) |

(52) U.S. Cl.
CPC ... *A45F 5/00* (2013.01); *B60R 9/10* (2013.01); *B60R 9/06* (2013.01); *B60P 7/0823* (2013.01); *Y10S 224/924* (2013.01)
USPC .................. 24/300; 24/301; 24/457; 224/924

(58) Field of Classification Search
USPC .......... 224/250; 24/300, 301, 457; 248/230.8, 248/505, 510
See application file for complete search history.

(56) References Cited

U.S. PATENT DOCUMENTS

| | | | | |
|---|---|---|---|---|
| 2,601,083 | A * | 6/1952 | Brouse | 74/502.5 |
| 3,784,030 | A * | 1/1974 | Chierici | 213/76 |
| 4,466,159 | A * | 8/1984 | Burrage | 24/16 PB |
| 4,769,875 | A * | 9/1988 | Hartman | 24/300 |
| 6,317,935 | B1 * | 11/2001 | O'Rouke | 24/129 R |
| 7,757,917 | B2 * | 7/2010 | Bogoslofski et al. | 224/537 |
| 7,805,816 | B1 * | 10/2010 | Thorne et al. | 24/301 |
| 7,810,685 | B2 * | 10/2010 | Bove et al. | 224/324 |
| 8,201,779 | B2 * | 6/2012 | Hua et al. | 248/53 |

(Continued)

OTHER PUBLICATIONS

Chinese Patent Office, Office Action dated Nov. 30, 2012 in corresponding Chinese Patent Application No. 201220344185.4, 2 pgs., China.

*Primary Examiner* — Robert J Sandy
*Assistant Examiner* — Louis Mercado
(74) *Attorney, Agent, or Firm* — Novak Druce Connolly Bove + Quigg LLP

(57) ABSTRACT

Flexible straps for a carrier include a strap body having a top, bottom, two lateral and two end surfaces. The strap body has a lengthwise axis, a widthwise axis and a thickness axis. At least one aperture can extend through the strap body from the top to the bottom surface and can be space apart from each other along the lengthwise axis by a spacer portion. The flexible strap includes a spacer cross-sectional area defined by an area of a cross-section of the spacer portion cut by a plane oriented orthogonally to the lengthwise axis. The flexible strap includes an aperture cross-sectional area defined by an area of a cross-section taken at a widthwise widest point of at least one of the apertures cut by a plane oriented orthogonally to the lengthwise axis. The aperture cross-sectional area is greater than at least two-thirds of the spacer cross-sectional area.

16 Claims, 6 Drawing Sheets

(56) References Cited

U.S. PATENT DOCUMENTS

| | | | |
|---|---|---|---|
| 8,220,678 B2 * | 7/2012 | Bove et al. | 224/324 |
| 8,534,522 B2 * | 9/2013 | Bogoslofski et al. | 224/537 |
| 2011/0107558 A1 * | 5/2011 | Hua et al. | 24/16 PB |
| 2011/0252604 A1 * | 10/2011 | Hansen | 24/301 |
| 2012/0168473 A1 * | 7/2012 | Arajakis | 224/250 |

* cited by examiner

FLEXIBLE STRAP FOR A SECUREMENT MECHANISM

CROSS-RELATED APPLICATIONS

This application claims the benefit of U.S. Provisional Application No. 61/508,501, entitled "Flexible Strap for a Securement Mechanism," filed on Jul. 15, 2011, which is incorporated herein by reference in its entirety.

FIELD OF TECHNOLOGY

The instant disclosure relates to securement mechanisms, and more specifically, to a flexible strap for releasable engagement.

BACKGROUND OF THE INVENTION

Securement devices can be used to secure a variety of different components and/or objects. For example, securement devices can close containers such as coolers or cargo boxes. Additionally, securement mechanisms can secure objects to carriers. For example, a securement mechanism can secure a bicycle to a bicycle carrier. The securement mechanism can prevent the container from opening or can keep an object affixed to the carrier. For example in the transportation of equipment, especially sports equipment, such as one or more bicycles, a portable load carrier frame is often utilized. The portable load carrier frame can be: attached at a hitch mount to the rear of a carrying vehicle, coupled to a roof of the carrying vehicle, mounted on a spare tire of the carrying vehicle, or integrated with the rear surface of the carrying vehicle.

BRIEF DESCRIPTION OF THE DRAWINGS

Implementations of the present application will now be described, by way of example only, with reference to the attached Figures, wherein.

DETAILED DESCRIPTION

Figure 1:
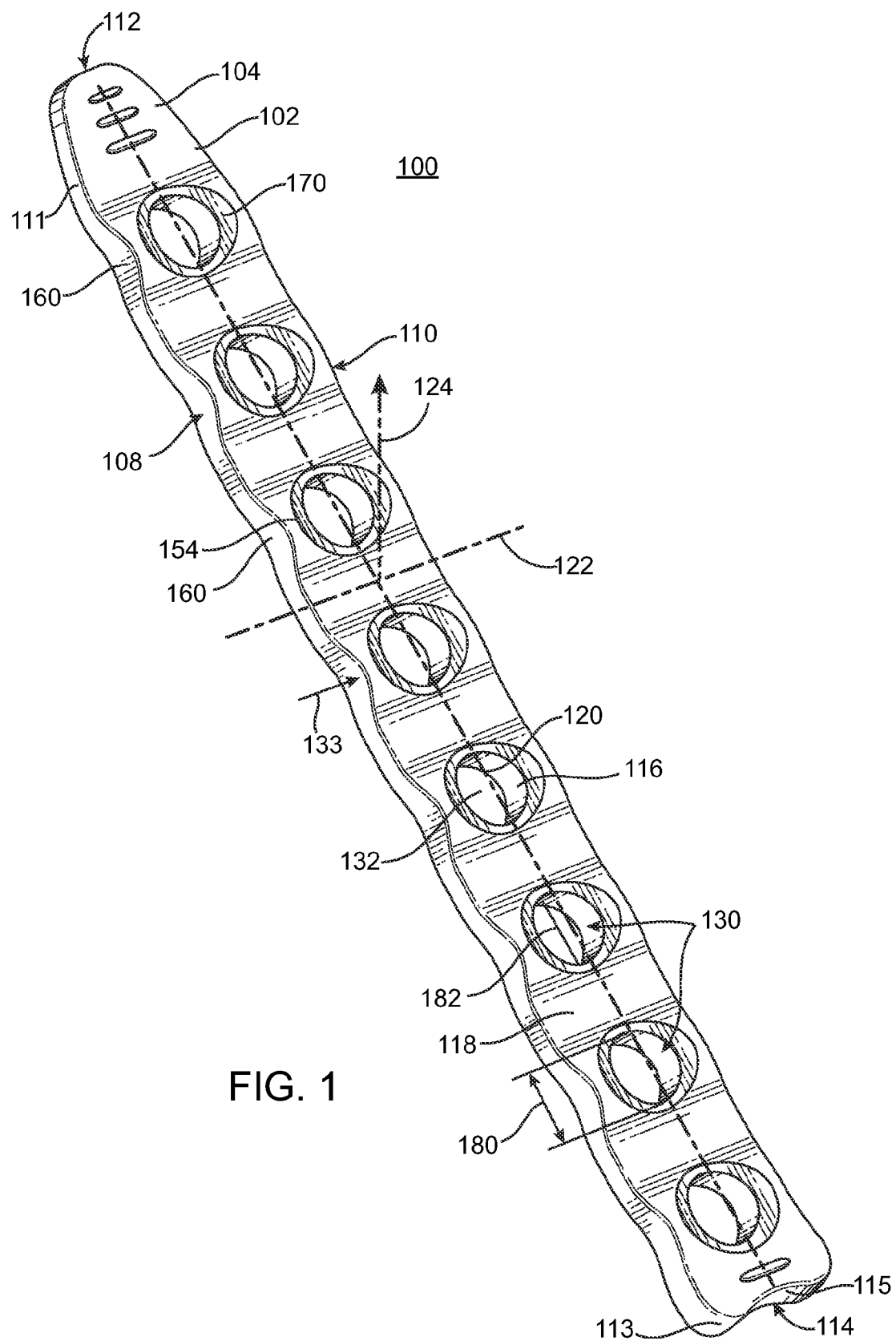
FIG. 1 is a perspective view of a flexible strap, in accordance with an exemplary implementation.

It will be appreciated that for simplicity and clarity of illustration, where appropriate, reference numerals have been repeated among the different figures to indicate corresponding or analogous elements. In addition, numerous specific details are set forth in order to provide a thorough understanding of the implementations described herein. However, it will be understood by those of ordinary skill in the art that the implementations described herein can be practiced without these specific details. In other instances, methods, procedures and components have not been described in detail so as not to obscure the related relevant function being described. Also, the description is not to be considered as limiting the scope of the implementations described herein.

The present disclosure presents a flexible strap that can be implemented to secure an article to a carrier. The examples illustrated herein focus on a bicycle carrier, but other securement devices are considered within the scope of this disclosure, for example a ski securement mechanism, a lid closure mechanism, a binding mechanism, and the like. The possibility of detachment of an expensive bicycle from a load carrier increases when the carrying vehicle travels over rough terrain. Any potential weakness associated with the means utilized to secure equipment to the load carrier frame could result in damage to the equipment either by falling from the frame or becoming sufficiently loose to collide with the frame or the carrying vehicle. Obviously, the securement of the sports equipment to the load carrier is of utmost importance to the operator, but ease of use is also an important consideration in the mind of the consumer. For example, the durability and life of the device that secures the sports equipment to the load carrier can be of importance to the operator.

The example flexible straps illustrated herein are for a bicycle carrier, but the teachings apply to other securement mechanisms as mentioned above. The flexible straps as presented herein are an improvement over previous straps. The flexible straps as presented herein are both flexible and secure. The flexible straps can be configured to resist cracking resulting from loads and stresses when the flexible strap is coupled to the securement mechanism.

In one example implementation, the flexible strap can include an elongate strap body. The elongate strap body can have a top surface, a bottom surface, two lateral surfaces, and two end surfaces. The strap body can have three orthogonally oriented axes, for example, a lengthwise axis, a widthwise axis, and a thickness axis. In one embodiment, a pair of apertures can extend through the strap body. For example, each aperture of the pair of apertures can extend through the strap body from the top to the bottom surface. Each aperture can also be bounded by a periphery formed by the body strap. In at least one implementation, the pair of apertures can be spaced apart. For example, the pair of apertures can be spaced apart one from the other along the lengthwise axis of the strap body by a spacer portion of the body. Although a pair of apertures is described, it will be appreciated that the elongate strap body can have one aperture extending therethrough. The spacer portion of the strap body can have a spacer cross-sectional area. The spacer cross-sectional area of the strap body material can be defined by an area of the cross-section of the spacer portion cut by a plane oriented orthogonally to the lengthwise axis of the strap body. The strap body can also have an aperture cross-sectional area of the body material. The aperture cross-sectional area can be defined by an area of a cross-section taken at a widthwise widest point of at least one of the pair of apertures cut by a plane oriented orthogonally to the lengthwise axis of the strap body. In at least one embodiment, the aperture cross-sectional area of the strap body material is greater than at least two-thirds of the spacer cross-sectional area of the strap body material. In another embodiment, the aperture cross-sectional area of the strap body material is greater than at least one-half of the spacer cross-sectional area of the strap body material.

Figure 11:
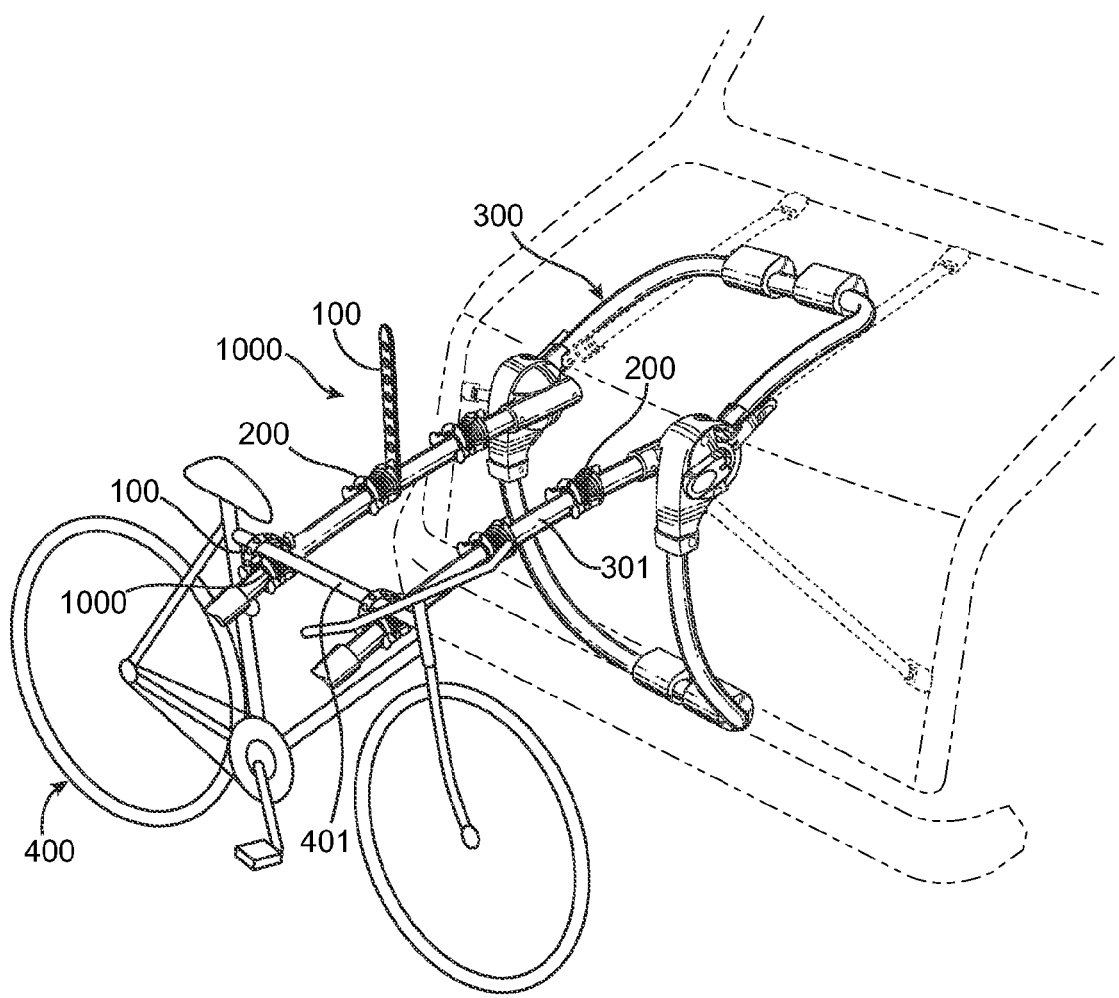
FIG. 11 is a perspective view of a carrier having the cradle illustrated in FIG. 10.

In one implementation, the flexible strap can be configured for attachment to a cradle of a bike rack, for example, as illustrated in FIG. 11, which will be discussed in further detail below. In such an implementation, one end of the flexible strap can be fixedly couplable to the cradle while the other end of the flexible strap is a free end that can be releasably coupled to an anchor of the cradle, thereby securing a portion of an article between the cradle and the elongate strap. The examples of the aperture cross-sectional area of the strap body as compared to the spacer cross-sectional area of the strap body can provide for increased strength relative to standard configurations of a strap body. Specifically, the cross-sectional area can reinforce the strength of the flexible strap at the apertures which releasably receive the attachment mechanisms (for example, anchors of a cradle, a buckle, a hook, or other attachment mechanism) of carrier assemblies. That is, the flexible strap can be pulled and stretched such that the apertures receive an attachment mechanism of a carrier assembly, thereby securing an article to the carrier assembly. In at least one implementation, the strap body is thicker and has more material surrounding the aperture. Thus, when tensile stress is placed on the flexible strap as the flexible strap is pulled and stretched over an attachment mechanism of the carrier assembly, the tensile stress placed on the portion of the strap defining the aperture is reduced. The increased cross-sectional area of the presently disclosed straps can enhance the life of the strap. That is, the likelihood that the strap will break or fail at the aperture is reduced. Furthermore, as excess strap material can be placed at the aperture cross-sectional area to provide an increased thickness as compared to the thickness of the spacer cross-sectional area, the manufacturing costs and labor can be reduced, since material at the spacer portion is not beyond the required amount. For example, the additional strap material at the aperture cross-sectional area will not increase the cost of the strap material, as the additional strap material can come from the material that would have otherwise been placed at the spacer cross-sectional area.

Figure 2:
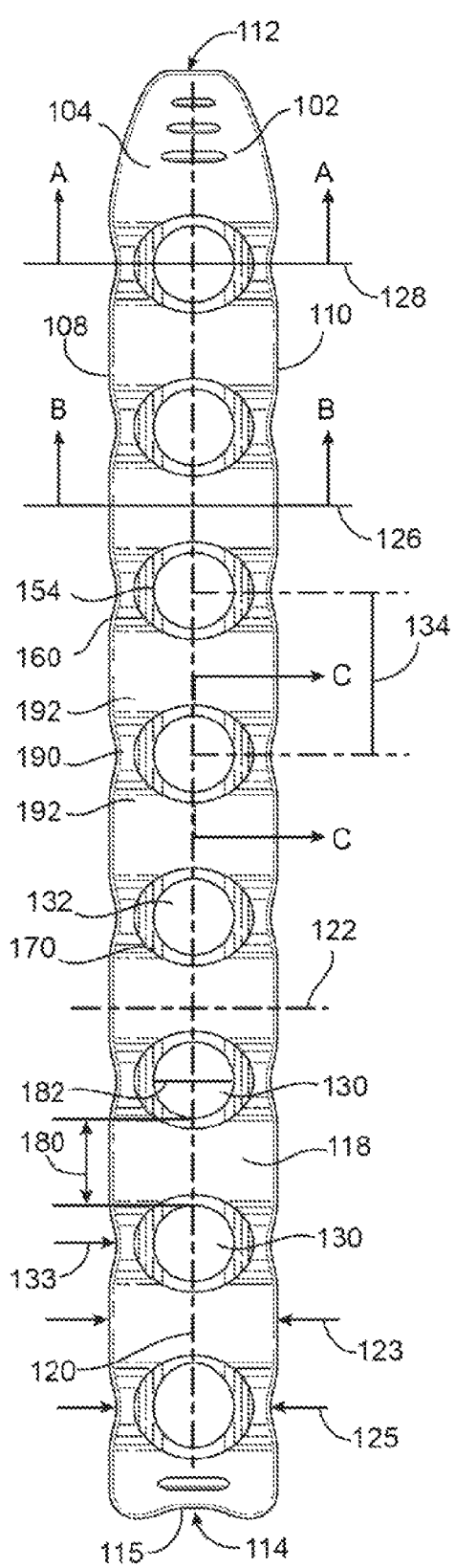
FIG. 2 is a top view of a flexible strap, in accordance with an exemplary implementation.

FIGS. 1-6 illustrate a flexible strap for releasably securing an article to a carrier in accordance with an exemplary implementation. As illustrated in FIGS. 1 and 2, the flexible strap 100 includes an elongate strap body 102. The elongate strap body 102 can be predominantly constructed of a flexible material. For example, the elongate strap body 102 can be constructed of rubber, plastic, elastomeric materials, or any other material or combination of materials that is flexible. The elongate strap body 102 has three axes 120, 122, 124. The three axes 120, 122, 124 can be orthogonally oriented to one another. In FIG. 1, the elongate strap body 102 includes a lengthwise axis 120, a widthwise axis 122, and a thickness axis 124. The elongate strap body 102 also includes a first end 113 and a second end 111. The first end 113 can be fixedly couplable to a carrier. For example, as illustrated in FIG. 2, the first end 113 can include an arched portion 115 that is configured to engage an arm of a carrier. The arched portion 115 can engage the arm of the carrier to maintain an upright alignment of the flexible strap 100 with respect to the carrier. The arched portion 115 can also maintain an alignment of the flexile strap 100 on an article that is secured to the carrier by the strap 100. In the exemplary implementation of FIGS. 1 and 2, the second end 111 is opposite to the first end 113 along the lengthwise axis 120 of the elongate strap body 102. The second end 111 can be a free end when the first end 113 is fixedly coupled to a carrier. The second end 111 can also be a free end configured for releasable engagement with an anchor or other attachment mechanism of the carrier. An exemplary implementation of the flexible strap 100 assembled with a carrier will be described in relation to FIGS. 10 and 11 below.

Referring to FIGS. 1-6, the elongate strap body 102 can also include a plurality of surfaces. For example, the elongate strap body 102 can have a top surface 104, a bottom surface 106 (shown in FIG. 3), a first lateral surface 108, a second lateral surface 110 (shown in FIG. 4), a first end surface 114 (more clearly shown in FIG. 5), and a second end surface 112 (more clearly shown in FIG. 6). A pair of apertures 130 can extend through the elongate strap body 102 in the direction of the thickness axis 124. In FIGS. 1 and 2, the elongate strap body 102 includes four pairs of apertures 130. Each aperture 132 of the pair of apertures 130 can extend from the top surface 104 to the bottom surface 106 of the elongate strap body 102. Each aperture 132 can also be bounded by a periphery 116 formed by the strap body 102. In other embodiments (not illustrated), a single aperture 132 can be implemented. When a single aperture 132 is implemented, the strap can be secured at a first point by a securement mechanism such as: being co-molded, a fastener, a clamp, or other mechanism. The single aperture 132 provides for a second securement point.

As illustrated in FIG. 1, the apertures 132 can be beveled. The beveled portion can reduce stress concentrations and provide for an enhanced flush fit with an anchor portion of a carrier assembly, for example, a cradle of the carrier assembly. An example of the beveled portion is illustrated in FIGS. 1 and 2. In FIGS. 1 and 2, each aperture can have an upper lip 170 about the periphery 116. The upper lip 170 can be beveled inwardly downward. For example, the upper lip 170 is beveled from the top surface 104 towards the bottom surface 106. In FIGS. 1 and 2, the upper lip 170 is beveled from the top surface 104 towards the bottom surface 106 such that the beveled surface of the upper lip 170 forms a downward slope from the top surface 104 to the bottom surface 106. Also illustrated in FIGS. 1 and 2, the upper lip 170 is beveled from the circumference of the aperture 132 towards the center of the aperture 132 beginning from the top surface 104 towards the bottom surface 106 of the strap body 102. In at least one implementation, the upper lip 170 of at least one of the apertures 132 can be beveled. In another implementation, each of the upper lips 170 of the pair of apertures 130 can be beveled.

The pair of apertures 130 can be spaced apart, one from the other. For example, the pair of apertures 130 can be spaced apart one from the other along the lengthwise axis 120 of the strap body 102. In one implementation, the apertures 132 of the pair of apertures 130 can be spaced apart by a distance 180 less than a diameter 182 of one of the apertures 132 of the pair of apertures 130, for example, as illustrated in FIGS. 1 and 2. The apertures 132 can be spaced apart by a distance 180 that is substantially the same as the diameter 182 of one of the apertures 132 of the pair of apertures 130. In another embodiment, the distance 180 between the pair of apertures 132 can be greater than the diameter 182 of one of the apertures 132. For example, the pair of apertures 130 can be located on opposite ends of the strap body 102. Other distances or spacings are considered within the scope of this disclosure so as to provide the appropriate securement point for the securement mechanism. As illustrated in FIGS. 1 and 2, the pair of apertures 130 can be spaced apart by a spacer portion 118 of the strap body 102. As illustrated in FIGS. 1 and 2, the spacer portion 118 can be located lengthwise adjacent to the aperture 132. The spacer portion 118 can also be oriented orthogonally to the lengthwise axis 120 of the strap body 102.

In the exemplary implementation illustrated in FIGS. 1-9, the flexible strap 100 can have a spacer cross-sectional area 140 (shown in FIG. 8) of the strap body material and an aperture cross-sectional area 150 (shown in FIG. 7) of the strap body material. The spacer cross-sectional area 140 can be defined by an area 142 (shown in FIG. 8) of a cross-section of the spacer portion of the strap body 102 cut by a plane 126 (shown in FIG. 2) oriented orthogonally to the lengthwise axis 120 of the strap body 102. The aperture cross-sectional area 150 can be defined by an area 152 (shown in FIG. 7) of a cross-section taken at a widthwise widest point 154 (shown in FIGS. 1 and 2) of at least one of the pair of apertures 130 cut by a plane 128 (shown in FIG. 2) oriented orthogonally to the lengthwise axis 120 of the strap body 102. In FIGS. 1-9, the aperture cross-sectional area 150 of body strap material can be greater than at least two-thirds of the spacer cross-sectional area 140 of strap body material. In other implementations, the aperture cross-sectional area 150 of strap body material can be greater than at least eighty percent, ninety percent, or seventy-five percent of the spacer cross-sectional area 140. In another implementation, the aperture cross-sectional area 150 of the strap body material can be greater than at least one-half of the spacer cross-sectional area 140. The greater aperture cross-sectional area 150 as compared to a percentage of the spacer cross-sectional area 140 can result in a greater amount of material at the aperture area 152, thereby enhancing the strength of the elongate strap 100 when tensile stress is placed on the strap 100. For example, the strap 100 is placed under tensile stress when the strap 100 is stretched and pulled to wrap around and secure an article to a carrier. The aperture area 152 experiences reduced tensile stress as the additional material that provides the greater aperture cross-sectional area 150 increases and reinforces the tensile strength of the strap 100. Thus, the life of the strap 100 is enhanced as the time it takes for the strap 100 to fail (for example, break or tear) at the aperture 132 is extended. That is, the likelihood that the strap 100 will fail at the aperture 132 is reduced, thereby extending the life of the strap 100. Although a specific percentage of spacer cross-sectional area 140 has been described, those of ordinary skill will appreciate that the aperture cross-sectional area 150 of strap body material can be greater than any other percentage or fraction of the spacer cross-sectional area 140 that reduces the wear on the aperture 132 of the strap 100 and extends the time to failure of the strap 100, for example, at the aperture 132.

Figure 9:
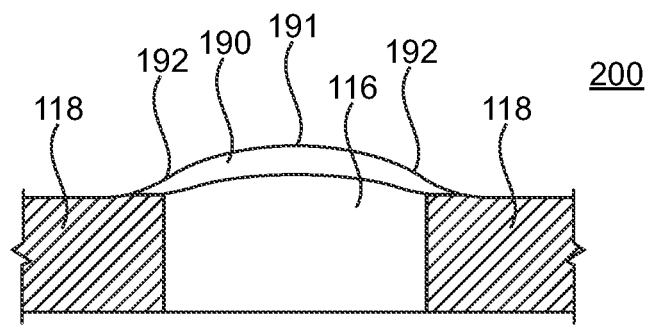
FIG. 9 is a cross-sectional view of the flexible strap illustrated in FIG. 2 taken along line C-C.

As a greater amount of material is placed adjacent, in a widthwise direction, to the aperture 132 of the strap, the contour of the strap body 102 will also change. For example, as illustrated in FIGS. 1, 2, 4, and 9, the contour of the strap body 102 widthwise adjacent each aperture 132 is raised as compared with the spacer portion 118. For example, as illustrated in FIGS. 1, 2, 4, and 9, the contour of the strap body 102 widthwise adjacent each aperture 132 can be a raised portion 190. The raised portion 190 can be a bump, hump, ridge, protrusion, convex portion, or other raised contour. In FIGS. 1, 2, 4, and 9, the raised portion 190 can be a bump having tapered sides. For example, the contour of the raised portion 190 is more clearly illustrated in FIG. 9 (which is a cross-sectional view of the strap body 102 in FIG. 2 taken along line C-C). In FIG. 9, the raised portion 190 has a tapering surface 192. For example, the tapering surface 192 tapers downwardly toward the spacer portion 118 from the apex 191 of the raised portion 190. In at least one implementation, the raised portion 190 can have two tapering surfaces 192. For example, the raised portion 190 can have each tapering surface 192 taper downwardly away from the apex 191 towards the spacer portion 118.

As illustrated in FIGS. 1, 2, 4, and 9, since the strap body 102 includes a raised portion 190, the thickness 161 at the raised portion 190 (measured parallel to the thickness axis 124) can be greater than the thickness 162 of the spacer portion 118. For example, a lateral portion 160 of the strap 102 that is widthwise adjacent to the widthwise widest point 154 of at least one of the pair of apertures 130 has a greater thickness 161, measured parallel to the thickness axis 124, than a greatest thickness 162 of the spacer portion 118. In one implementation, the lateral portion 160 of the strap body 102 widthwise adjacent to the widthwise widest point 154 of the at least one of the pair of apertures 130 has a thickness 161 that is at least a third ($1/3$) greater than the greatest thickness 162 of the spacer portion 118. However, the thickness 161 of the lateral portion 160 can be any percentage or fraction greater than the greatest thickness 162 of the spacer portion 118. FIGS. 1, 2, 4 and 9 illustrate the thickness 161 of each of the two lateral portions 160 of the strap body 102 widthwise adjacent to the widthwise widest point 154 of the at least one of the pair of apertures 130 being greater than the greatest thickness 162 of the spacer portion 118. However, those of ordinary skill in the art will appreciate that in another implementation the thickness 161 of only one of the lateral portions 160 of the strap body 102 widthwise adjacent to the widthwise widest point 154 of the at least one of the pair of apertures 130 can be greater than the greatest thickness 162 of the spacer portion 118.

Figure 3:
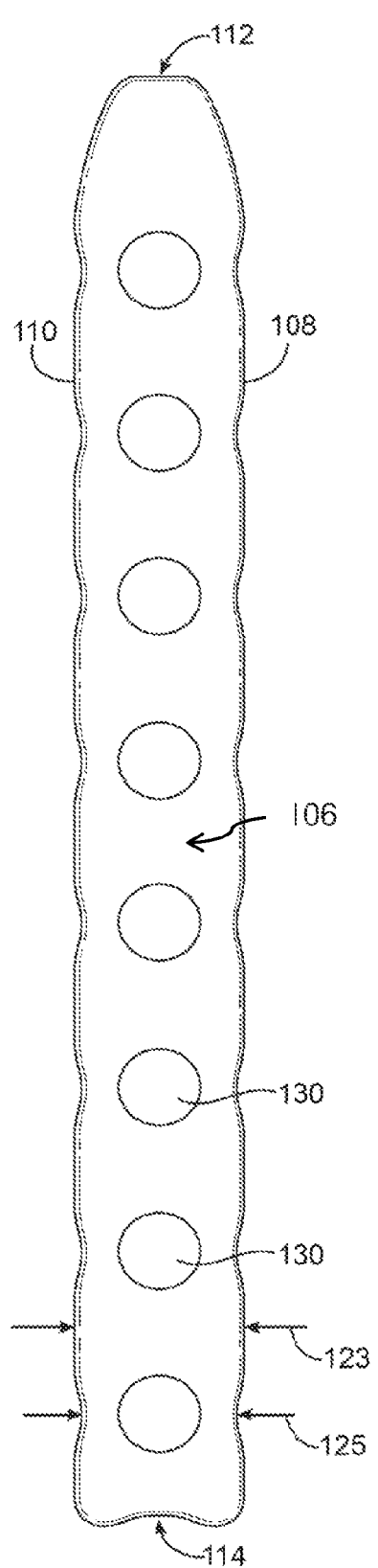
FIG. 3 is a rear view of the flexible strap illustrated in FIG. 2.
Figure 4:
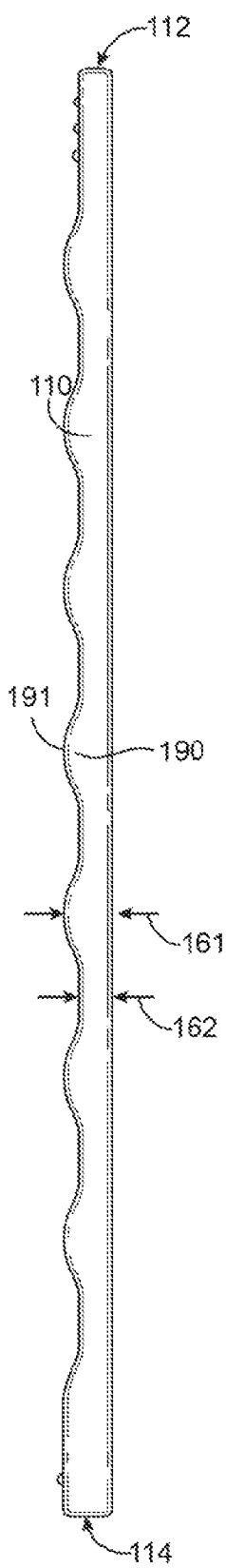
FIG. 4 is a side view of the flexible strap illustrated in FIG. 2.
Figure 5:
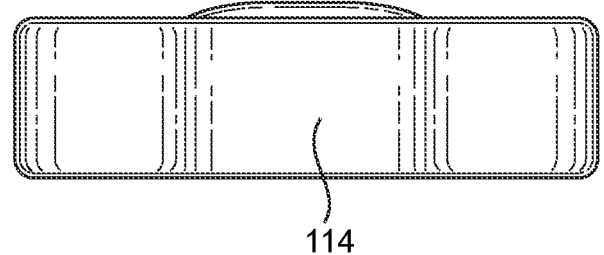
FIG. 5 is a first elevational end view of the flexible strap illustrated in FIG. 2.
Figure 6:
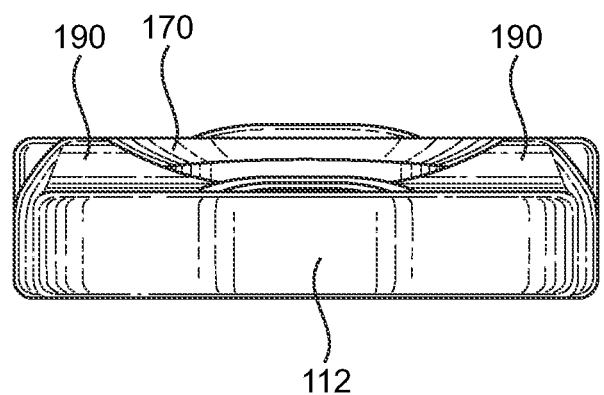
FIG. 6 is a second elevational end view of the flexible strap illustrated in FIG. 2.
Figure 7:
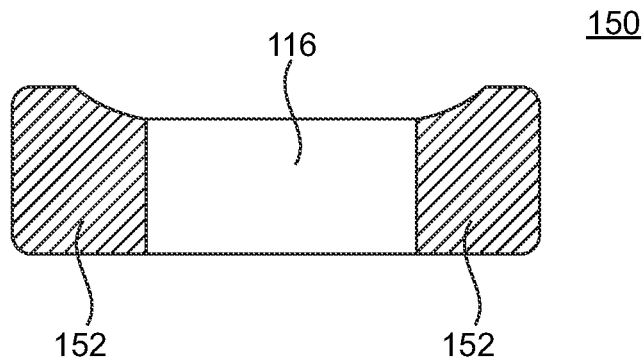
FIG. 7 is a cross-sectional view of the flexible strap illustrated in FIG. 2 taken along line A-A.
Figure 8:
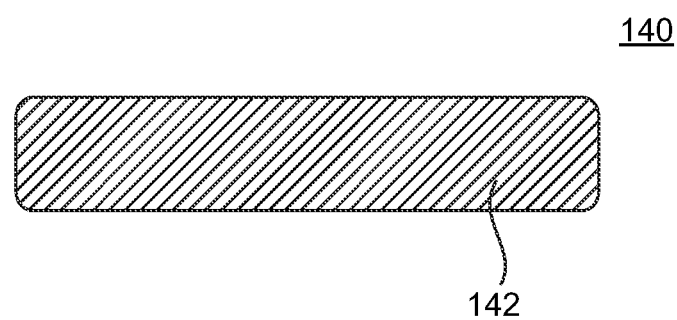
FIG. 8 is a cross-sectional view of the flexible strap illustrated in FIG. 2 taken along line B-B.

In another implementation, the strap body 102 can be widthwise more narrow at the widthwise widest point 154 of at least one of the pair of apertures 130 than at the spacer portion 118. As illustrated in FIGS. 2 and 3, the widthwise width 123 at the widthwise widest point 154 of one of the pair of apertures 130 is less than the widthwise width 125 of the spacer portion 118. For example, in FIG. 2, the widthwise width 123 at the widthwise widest point 154 of the aperture 132 can be approximately twenty (20) millimeters. The widthwise width 125 of the spacer portion 118 can be approximately twenty-three (23) millimeters. However, the widthwise widths 123, 125 can be any measurement so long as the widthwise width 123 at the widthwise widest point 154 of the aperture 132 is narrower than the widthwise width 125 of the spacer portion 118.

In another implementation, the lateral surface 108 of the flexible strap 100 can include a curved portion 135. For example, as illustrated in FIGS. 1-3, the lateral surface 108 can include a curved portion 135 adjacent the widthwise widest point 154 of at least one of the pair of apertures 130. In FIGS. 1-3, the curved portion 135 can be curved inwardly along the widthwise axis 122 towards the center of the aperture 132. As a result, the lateral surface 108 of the strap 100 has a radius of curvature 133. The curved portion 135 can enhance the gripability of the strap 100 as the operator pulls the strap 100 off of an attachment mechanism of a carrier and stretches the strap 100 to secure the strap 100 to the attachment mechanism of the carrier. For example, the curved portion 135 can be ergonomically shaped and sized to fit a person's hand, thereby enhancing the comfort and gripability of an operator's hand.

Figure 10:
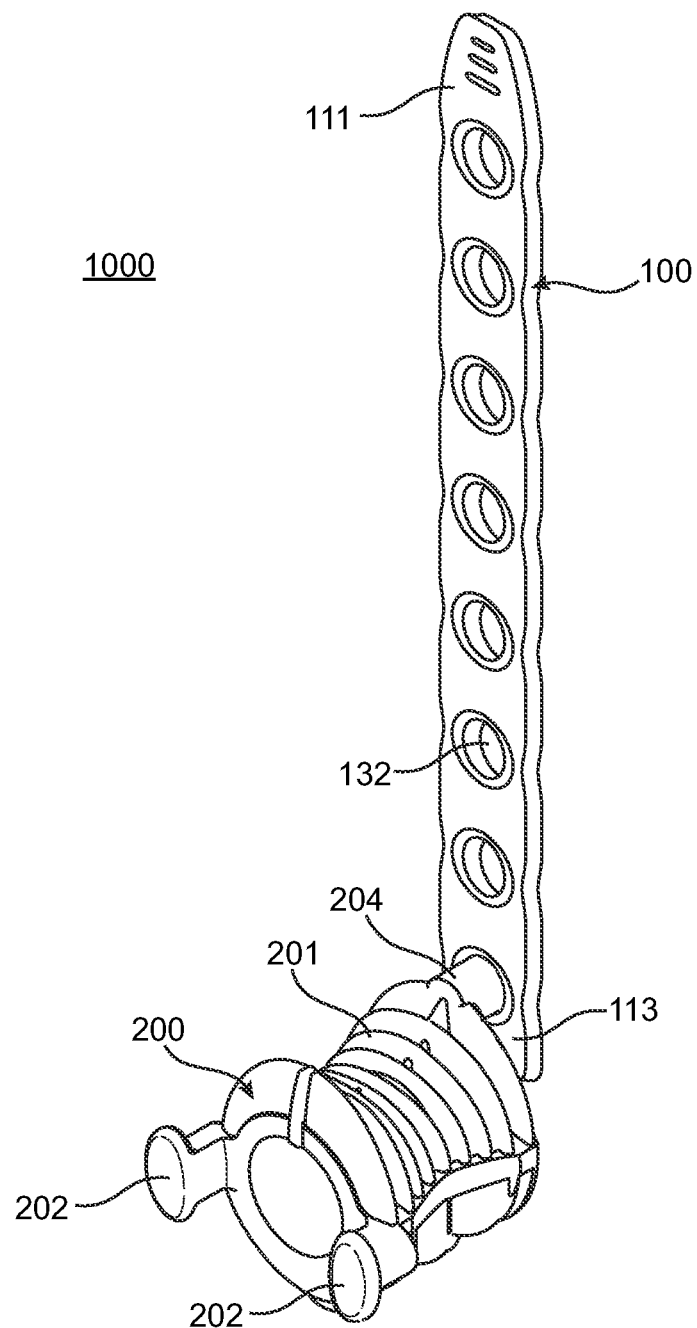
FIG. 10 is a perspective view of an exemplary cradle including a flexible strap, in accordance with an exemplary implementation.

FIG. 10 illustrates an assembled cradle 1000 for a transport carrier 300 shown in FIG. 11. The exemplary assembled cradle 1000 can include a cradle 200 assembled with the flexible strap 100 of the present disclosure. As illustrated in FIG. 10, the cradle 200 includes a protruding member 204. The rear protruding member 204 is configured to receive an aperture 132 of the strap 100 proximate to the first end 113 of the strap 100. For example, the rear protruding member 204 can be an anchor, a knob, a button, or other protruding member. The first end 113 of the strap 100 can be removably coupled to the protruding member 204. However, in an assembled configuration of the cradle 200 with the flexible strap 100, the first end 113 of the strap 100 will be fixably received by the protruding member 204, such that the second end 111 of the strap 100 is a free end. The cradle 200 can also include at least one anchor member 202 positioned opposite to the protruding member 204. In FIG. 10, the cradle 200 includes two anchor members 202, but those of ordinary skill in the art will appreciate that fewer or more than two anchor members 202 can be included so long as there is at least one anchor member 202. The anchor member 202 can be an anchor, a hook, or other protrusion that is insertable in an aperture 132 proximate to the second end 113 of the strap 100. In between the anchor members 202 and the protruding member 204 can be a saddle 201. The saddle 201 is configured to receive a portion of an article to be secured to the carrier 300. For example, the saddle 201 can receive a frame tube of a bicycle for securement to the carrier 300.

FIG. 11 illustrates a carrier 300 having a bicycle secured thereto. The carrier 300 includes a frame 301 having a plurality of assembled cradles 1000 (for example, the assembled cradles 1000 illustrated in FIG. 10) received on the bicycle frame 301. As illustrated in FIG. 11, a bicycle 401 can be secured to two of the cradles 200 by the flexible straps 100 described herein. As shown in FIG. 11, a tube 401 of the bicycle 401 is received by the saddle 201 of the cradle 200. The second end 113 of the strap 100 is then pulled towards the anchor members 202 and over the tube 401 of the bicycle 400. The second end 113 is also pulled such that one of the anchor members 202 is inserted into one of the apertures 132 of the strap 100. In an assembled configuration, the bicycle tube 401 is secured to the carrier 300 between the strap 100 and the saddle 201 of the cradle 201. The strap 100 wraps across a top surface of the bicycle tube 401, and as the anchor member 202 is received in one of the apertures 132, the strap 100 is holds the bicycle tube 401 onto the cradle 200, thereby securing the bicycle 401 to the carrier 300. When the bicycle 400 is to be removed from the carrier 300, the strap 100 can be pulled by the second end 113 in the direction of the lengthwise axis 120 of the strap 100 to stretch the material of the strap 100. As the strap 100 is pulled and stretched, the strap 100 can be pulled away from the anchor member 202, thereby releasing the bicycle 400 from the cradle 200. As the strap 100 is pulled and stretched each time an article is secured and removed from the cradle 200, the tensile strength of the strap 100 can be weakened. However, the disclosed strap 100 provides for enhanced tensile strength of the strap 100 which can thereby extend the life of the strap and reduce the likelihood that the strap 100 will fail at the aperture 132.

Although FIGS. 10 and 11 illustrate a cradle 200 and a carrier 300 for bicycles, those of ordinary skill in the art will appreciate that the strap 100 can be implemented on other carriers 300, for example, a ski carrier, a snow board carrier, a carrier mountable onto a vehicle hitch, a carrier mountable onto a top rack of a vehicle, or any other carrier on which an article can be secured thereto by a strap 100.

Although FIGS. 1-11 illustrate eight apertures 132 (for example, four pairs of apertures 130), those of ordinary skill in the art will appreciate that the elongate strap body 102 can have any number of apertures 132. The strap 100 can have an even number of apertures 132 (hence, any number of pairs of apertures 130), an odd number of apertures 132, or one aperture 132. For example, for an implementation in which the flexible strap 102 includes one aperture 132, the flexible strap 102 can have an aperture 132 extending through the strap body 102 from the top 104 to the bottom surface 106 and bounded by a periphery 116 formed by the strap body 102. An extension portion 118 of the strap body 102 can be lengthwise adjacent to the aperture 132. The strap body 102 can include an extension cross-sectional area 140 of strap body material. The extension cross-sectional area 140 can be defined by an area 142 of a cross-section of the extension portion of the strap body 102 cut by a plane 126 oriented orthogonally to the lengthwise axis 120 of the strap body 102. The strap body 102 can also include an aperture cross-sectional area 150 of strap body material. The aperture cross-sectional area 150 can be defined by an area 152 of a cross-section taken at a widthwise widest point 154 of the aperture 132 cut by a plane 128 oriented orthogonally to the lengthwise axis 120 of the strap body. The aperture cross-sectional area 150 of strap body material can be greater than at least one half of the spacer cross-sectional area 140 of strap body material, thereby providing the enhanced tensile strength of the strap 102 as described above.

Although FIGS. 1-11 illustrate apertures 132 that are circular in shape, those of ordinary skill in the art will appreciate that the apertures 132 can be other shapes. For example, the apertures 132 can be D-shaped, oval, elliptical, or any other shape that can receive an anchor 202 or attachment mechanism of a carrier.

Exemplary implementations have been described hereinabove regarding a flexible strap for a carrier. While specific, exemplary embodiments have been shown and described, various modifications to and/or departures from the disclosed embodiments will occur to those having skill in the art. One of ordinary skill in the art will also appreciate that the elements and features described and illustrated in the figures herein can be optionally included to achieve the benefits of the presently disclosed flexible strap for a carrier. Additionally, those skilled in the art will appreciate that features in each of the figures described herein can be combined with one another and arranged to achieve the described benefits of the presently disclosed flexible strap. Various modifications to and departures from the disclosed implementations will occur to those having skill in the art. The subject matter that it is desired to protect is set forth in the following claims.

What is claimed is:

1. A flexible strap for releasably securing an article to a transport carrier, the strap comprising:

an elongate strap body predominantly constructed of a flexible material and having a top surface, a bottom surface, two lateral surfaces, and two end surfaces;

the strap body having three orthogonally oriented axes comprising a lengthwise axis, a widthwise axis, and a thickness axis;

a pair of apertures, each aperture extending through the strap body from the top surface to the bottom surface and bounded by a periphery formed by the strap body;

the pair of apertures spaced apart, one from the other, along the lengthwise axis of the strap body, by a spacer portion of the strap body;

a spacer cross-sectional area of strap body material is defined by an area of a cross-section of the spacer portion of the strap body cut by a plane oriented orthogonally to the lengthwise axis of the strap body;

an aperture cross-sectional area of strap body material is defined by an area of a cross-section taken at a widthwise widest point of at least one of the apertures cut by a plane oriented orthogonally to the lengthwise axis of the strap body;

wherein the aperture cross-sectional area of strap body material is greater than at least two-thirds of the spacer cross-sectional area of strap body material; and a lateral portion of the strap body widthwise adjacent to the widthwise widest point of the at least one of the apertures has a greater thickness, measured parallel to the thickness axis, than the greatest thickness of the spacer portion.

2. The flexible strap as recited in claim 1, wherein the aperture cross-sectional area of strap body material is greater than at least eighty percent that of the spacer cross-sectional area of strap body material.

3. The flexible strap as recited in claim 1, wherein the aperture cross-sectional area of strap body material is greater than at least ninety percent that of the spacer cross-sectional area of strap body material.

4. The flexible strap as recited in claim 1, wherein the aperture cross-sectional area of strap body material is greater than at least seventy-five percent that of the spacer cross-sectional area of strap body material.

5. The flexible strap as recited in claim 1, wherein the strap body is widthwise more narrow at the widthwise widest point of the at least one of the pair of apertures than at the spacer portion.

6. The flexible strap as recited in claim 1, wherein a thickness of the lateral portion of the strap body widthwise adjacent to the widthwise widest point of the at least one of the apertures is at least a third greater than the greatest thickness of the spacer portion.

7. The flexible strap as recited in claim 1, wherein each of two lateral portions of the strap body widthwise adjacent to the widthwise widest point of the at least one of the apertures has a greater thickness, measured parallel to the thickness axis, than the greatest thickness of the spacer portion.

8. The flexible strap as recited in claim 7, wherein a thickness of each of the two lateral portions of the strap body widthwise adjacent to the widthwise widest point of the at least one of the apertures is at least a third greater than the greatest thickness of the spacer portion.

9. The flexible strap as recited in claim 1, wherein an upper lip about the periphery of the at least one of the apertures is beveled inwardly downward.

10. The flexible strap as recited in claim 1, wherein an upper lip about the periphery of each of the pair of apertures is beveled inwardly downward.

11. The flexible strap as recited in claim 1, further comprising at least one additional pair of apertures.

12. The flexible strap as recited in claim 11, wherein the at least one additional pair of apertures comprises three pairs of apertures.

13. The flexible strap as recited in claim 1, wherein the pair of apertures are spaced apart by a distance less than a diameter of one of the pair of apertures.

14. The flexible strap as recited in claim 1, wherein the pair of apertures are spaced apart by a distance substantially the same as a diameter of one of the pair of apertures.

15. A flexible strap for releasably securing an article to a transport carrier, the strap comprising:

an elongate strap body predominantly constructed of a flexible material and having a top surface, a bottom surface, two lateral surfaces, and two end surfaces;

the strap body having three orthogonally oriented axes comprising a lengthwise axis, a widthwise axis and a thickness axis;

a pair of apertures, each aperture extending through the strap body from the top to the bottom surface and bounded by a periphery formed by the strap body;

the pair of apertures spaced apart, one aperture from the other aperture, along the lengthwise axis of the strap body, by a spacer portion of the strap body;

a spacer cross-sectional area of strap body material is defined by an area of a cross-section of the spacer portion of the strap body cut by a plane oriented orthogonally to the lengthwise axis of the strap body;

an aperture cross-sectional area of strap body material is defined by an area of a cross-section taken at a widthwise widest point of at least one of the apertures cut by a plane oriented orthogonally to the lengthwise axis of the strap body;

wherein the strap body is widthwise more narrow at the widthwise widest point of the at least one of the pair of apertures than at the spacer portion; and wherein the aperture cross-sectional area of strap body material is greater than at least one half of the spacer cross-sectional area of strap body material.

16. A flexible strap for releasably securing an article to a transport carrier, the strap comprising:

an elongate strap body predominantly constructed of a flexible material and having a top surface, a bottom surface, two lateral surfaces, and two end surfaces;

the strap body having three orthogonally oriented axes comprising a lengthwise axis, a widthwise axis and a thickness axis;

an aperture extending through the strap body from the top to the bottom surface and bounded by a periphery formed by the strap body;

the aperture having an extension portion of the strap body lengthwise adjacent thereto;

an extension cross-sectional area of strap body material is defined by an area of a cross-section of the extension portion of the strap body cut by a plane oriented orthogonally to the lengthwise axis of the strap body;

an aperture cross-sectional area of strap body material is defined by an area of a cross-section taken at a widthwise widest point of the aperture cut by a plane oriented orthogonally to the lengthwise axis of the strap body;

wherein the aperture cross-sectional area of strap body material is greater than at least one half of the extension cross-sectional area of strap body material; and the strap body is widthwise more narrow at the widthwise widest point of the aperture than at the extension portion.

* * * * *